United States Patent
Ramsey

(10) Patent No.: US 9,703,868 B2
(45) Date of Patent: Jul. 11, 2017

(54) RECONCILING QUERY RESULTS ASSOCIATED WITH MULTIPLE INDICES

(71) Applicant: Microsoft Corporation, Redmond, WA (US)

(72) Inventor: William D. Ramsey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 14/311,721

(22) Filed: Jun. 23, 2014

(65) Prior Publication Data

US 2015/0370896 A1    Dec. 24, 2015

(51) Int. Cl.
*G06F 17/30*    (2006.01)

(52) U.S. Cl.
CPC .. *G06F 17/30864* (2013.01); *G06F 17/30442* (2013.01); *G06F 17/30684* (2013.01); *G06F 17/30946* (2013.01)

(58) Field of Classification Search
CPC ......... G06F 17/30864; G06F 17/30442; G06F 17/30684; G06F 17/30946
USPC ................. 707/705, 715, 741, 742
See application file for complete search history.

(56) References Cited

U.S. PATENT DOCUMENTS

| | | | |
|---|---|---|---|
| 5,604,897 A | 2/1997 | Travis | |
| 5,875,443 A | 2/1999 | Nielsen | |
| 6,401,084 B1 | 6/2002 | Ortega et al. | |
| 6,785,869 B1 | 8/2004 | Berstis | |
| 7,630,978 B2 | 12/2009 | Li et al. | |
| 2002/0194229 A1 | 12/2002 | Decime et al. | |
| 2005/0149500 A1* | 7/2005 | Marmaros | G06F 17/30864 |
| 2005/0192946 A1* | 9/2005 | Lu | G06F 17/30864 |
| 2006/0129543 A1* | 6/2006 | Bates | G06F 17/273 |
| 2007/0192310 A1* | 8/2007 | Takagi | G06F 17/30038 |
| 2008/0208567 A1* | 8/2008 | Brockett | G06F 17/274 704/9 |
| 2011/0078135 A1* | 3/2011 | Whitehead | G06F 17/30336 707/715 |
| 2014/0129584 A1* | 5/2014 | Maple | G06F 17/30864 707/760 |

OTHER PUBLICATIONS

Gupta, et al., "Spell Checking Techniques in NLP: A Survey", In International Journal of Advanced Research in Computer Science and Software Engineering, vol. 2, Issue 12, Dec. 2012, 5 pages.

* cited by examiner

*Primary Examiner* — Hares Jami
(74) *Attorney, Agent, or Firm* — Shook, Hardy & Bacon L.L.P.

(57) ABSTRACT

Systems, methods, and computer-readable storage media are provided for reconciling query results associated with multiple indices. A search query having a first spelling is received. A plurality of query results is determined, each query result being derived from one of a plurality of indices. At least a first index is associated with a lexicon that is specific to a user computing device and at least a second index is associated with a lexicon that is specific to web-based content. Each query result may be a query result determined based upon the first spelling for the search query, a suggested alternate spelling for the received search query, a query result determined based upon the suggested alternate spelling for the received search query, or a null result. One or more of the query results then is selected as responsive to the received search query.

20 Claims, 3 Drawing Sheets

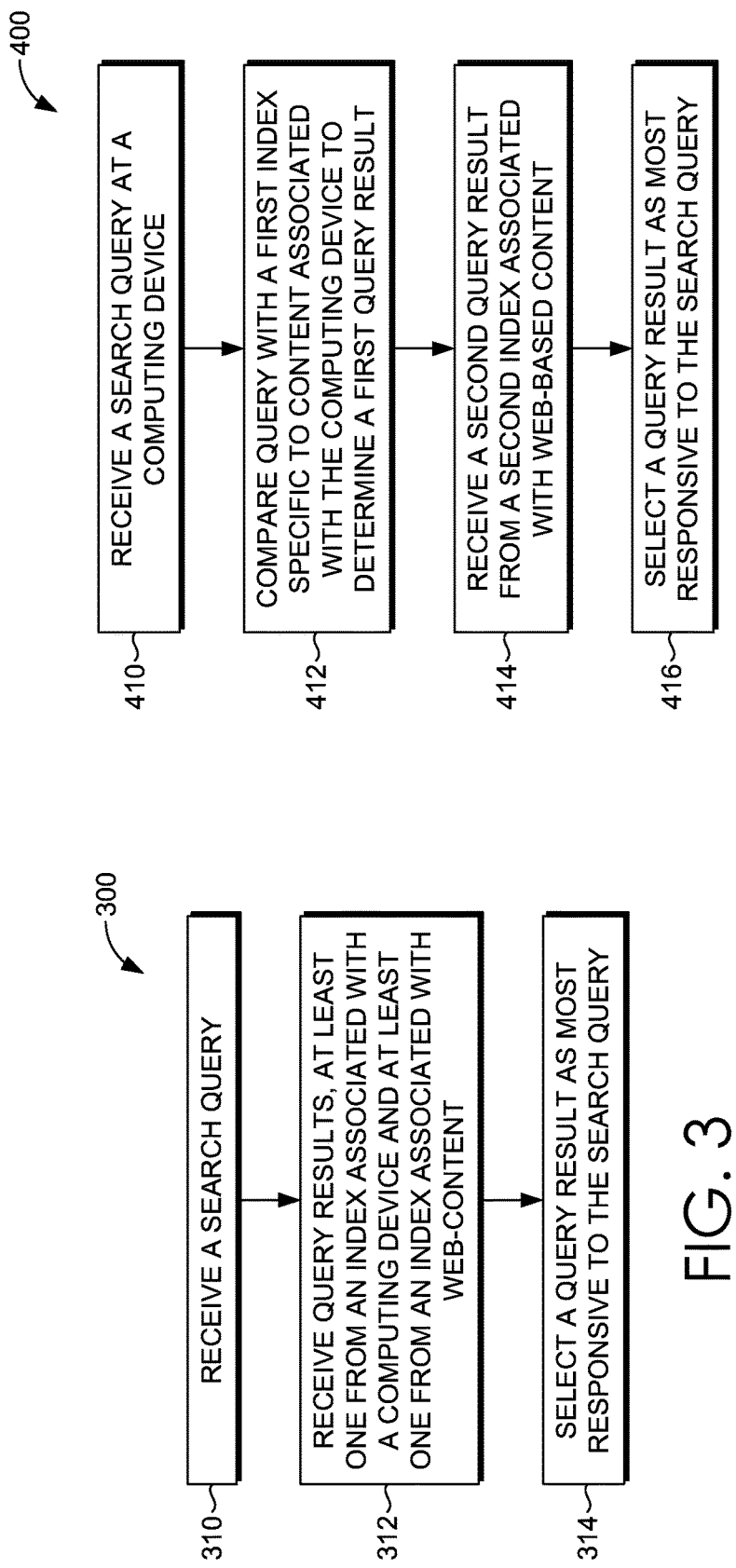

RECONCILING QUERY RESULTS ASSOCIATED WITH MULTIPLE INDICES

BACKGROUND

Multiple online search engines exist today that permit users to search multiple sources of content on the World Wide Web (web) from a common interface. Users typically input a search query comprised of one or more words or symbols into a designated search input region and the search engine utilizes the input search query to conduct a search of numerous web content sources in an attempt to return relevant information to the user. Often, and particularly as the size of devices permitting such search query input decreases, desired search queries as input by users are misspelled. As such, automatic spelling correction functionality is often coupled with a search engine so that relevant results may be determined even if the search query input by the user is not completely as intended. Such automatic spelling correction functionality generally utilizes aggregate user behavior over a large plurality of users to identify common misspellings and common second search queries issued subsequent to a misspelling to identify and make educated decisions about potential spelling corrections.

While generally not approximating the amount of information available on the web, a vast amount of information is available that is specific to and stored in association with a user's local computing device. Such information may include, without limitation, personal contacts, files, applications, settings, and the like. Traditional spelling correction functionality utilized by web search engines offers a less than optimal aid to assist users in locating locally stored content as such local content may differ drastically from web content. Additionally, a particular user's search patterns may vary greatly from that of the masses utilized in establishing appropriate spell correction on the web.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for reconciling query results associated with multiple indices. A search query having a first spelling is received, for instance, from a user computing device. A plurality of query results is determined, each query result being derived from one of a plurality of indices. At least a first index of the plurality of indices is associated with a lexicon that is specific to the computing device and at least a second index of the plurality of indices is associated with a lexicon that is specific to web-based content. Each query result may be a result determined based upon the first spelling for the search query, a suggested alternate spelling for the received search query, a result determined based upon the suggested alternate spelling for the received search query, or a null result. One or more of the query results then is selected as responsive to the received search query for display in response thereto. The displayed results may be derived from the lexicon specific to the computing device, the lexicon specific to the web-based content, or both.

BRIEF DESCRIPTION OF THE DRAWINGS

The present invention is illustrated by way of example and not limitation in the accompanying figures in which like reference numerals indicate similar elements and in which:

FIG. 3 is a flow diagram showing an exemplary method for reconciling query results associated with multiple indices, in accordance with an embodiment of the present invention; and FIG. 4 is a flow diagram showing another exemplary method for reconciling query results associated with multiple indices, in accordance with an embodiment of the present invention.

DETAILED DESCRIPTION

Figure 1:
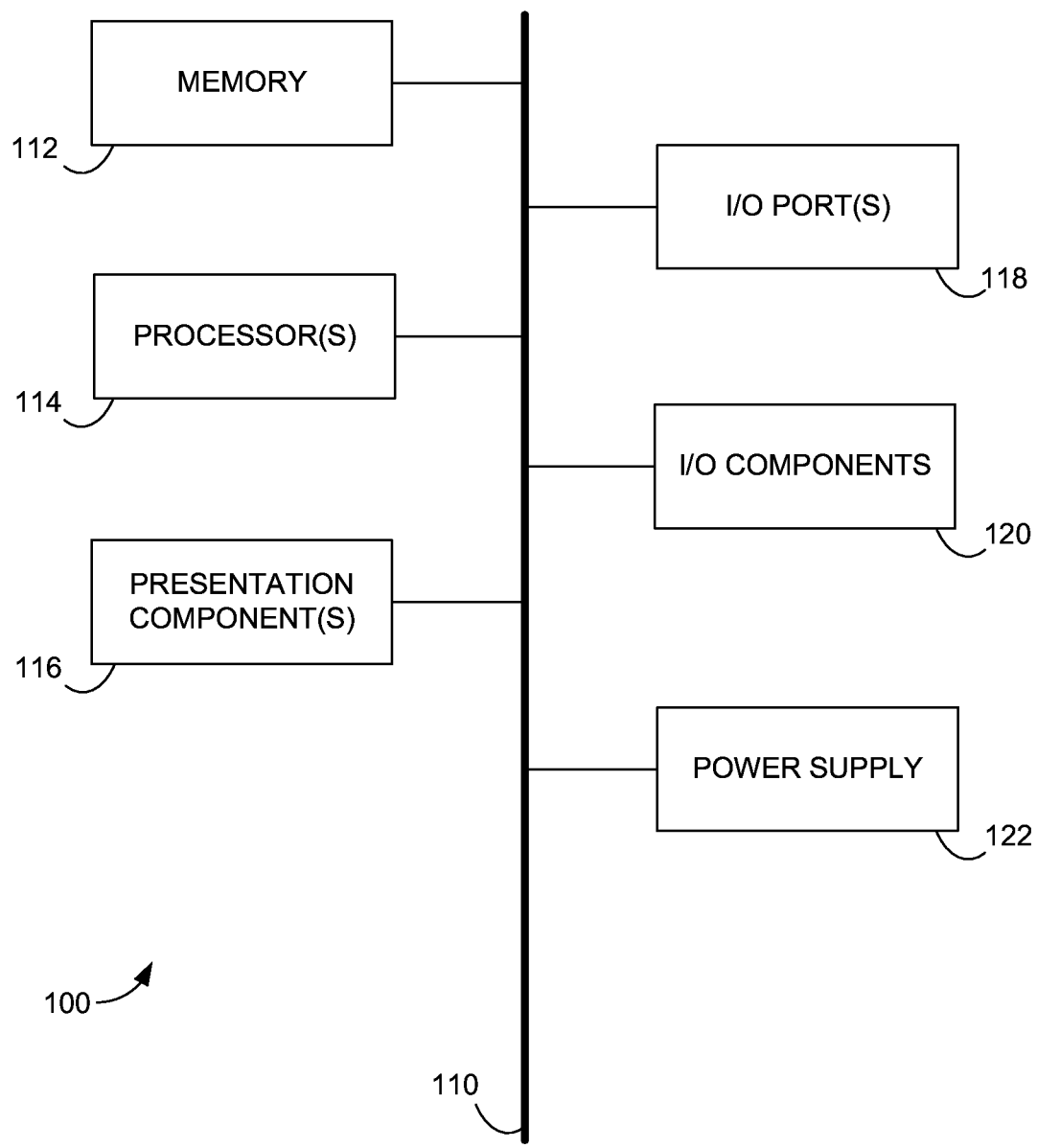
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for reconciling query results associated with multiple indices. A search query having a first spelling is received, for instance, from a user computing device. A plurality of query results is determined, each query result being derived from one of a plurality of indices. At least a first index of the plurality of indices is associated with a lexicon that is specific to the computing device and at least a second index of the plurality of indices is associated with a lexicon that is specific to web-based content. Each query result may be a result determined based upon the first spelling for the search query, a suggested alternate spelling for the received search query, a result determined based upon the suggested alternate spelling for the received search query, or a null result. One or more of the query results then is selected as responsive to the received search query for display in response thereto. In accordance with embodiments hereof, the displayed results may be derived from the lexicon specific to the computing device, the lexicon specific to the web-based content, or both.

Accordingly, one embodiment of the present invention is directed to one or more computer-readable storage media storing computer-useable instructions that, when used by one or more computing devices, cause the one or more computing devices to perform a method for reconciling query results associated with multiple indices. The method includes, at a computing device, receiving a search query having a first spelling and receiving a plurality of query results for the search query. Each query result is derived from one of a plurality of indices, at least a first of the plurality of indices being associated with a lexicon that is specific to the computing device and at least a second of the plurality of indices being associated with a lexicon that is specific to web-based content. The method further includes selecting one or more of the received query results as most responsive to the search query.

In another embodiment, the present invention is directed to a method being performed by one or more computing devices including at least one processor, the method for reconciling query results associated with multiple indices. The method includes, at a computing device, receiving a first search query having a first spelling, comparing the received search query with a first index to determine a first query result, and receiving a second query result from a comparison of the received search query with a second index. The first index is specific to content associated with the computing device and the second index is specific to web-based content. One of the first query result and the second query result is selected as most responsive to the received search query. The selected query result is one of a result determined based upon the first spelling for the search query, a suggested alternate spelling for the received search query, a result determined based upon the suggested alternate spelling for the received search query, and a null result indicating no probable query results may be determined based upon the first spelling or any plausible alternate spellings for the received search query.

In yet another embodiment, the present invention is directed to a system including a computing device having one or more processors and one or more computer-readable storage media, and a data store coupled with the computing device, the data store having an index associated therewith that is specific to a lexicon of the computing device. The computing device is configured to receive a search query having a first spelling; compare the received search query with the index to determine a first query result, the first query result being specific to content associated with the computing device and being associated with a spell-check tool for the computing device content; receive a second query result that is specific to web-based content and being associated with a spell-check tool for the web-based content; and select one or both of the first query result and the second query result as responsive to the received search query. Each selected query result is one of a result determined based upon the first spelling for the search query, a suggested alternate spelling for the received search query, a result determined based upon the suggested alternate spelling for the received search query, and a null result.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor hereof recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller (such as a stylus, keyboard, and mouse) or a natural user interface (NUI), etc.

A NUI processes gestures (e.g., hand, face, body, etc.), voice, or other physiological inputs generated by a user. These inputs may be interpreted, for instance, as requests for information, requests to alter displays in accordance with particular instructions, or the like. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein also may be practiced in distributed computing environments where tasks are performed by remote processing devices that are linked through a communications network. In a distributed computing environment, program modules may be located in both local and remote computer storage media including memory storage devices.

Furthermore, although the term "search engine" is used herein, it will be recognized that this term may also encompass a server, a Web browser, a set of one or more processes distributed on one or more computers, one or more stand-alone storage devices, a set of one or more other computing or storage devices, a combination of one or more of the above, and the like.

As previously mentioned, embodiments of the present invention are generally directed to systems, methods, and computer-readable storage media for reconciling query results associated with multiple indices. A search query having a first spelling is received, for instance, from a user computing device. A plurality of query results is determined, each query result being derived from one of a plurality of indices. At least a first index of the plurality of indices is associated with a lexicon that is specific to the computing device and at least a second index of the plurality of indices is associated with a lexicon that is specific to web-based content. Each query result may be a result determined based upon the first spelling for the search query, a suggested alternate spelling for the received search query, a result determined based upon the suggested alternate spelling for the received search query, or a null result. One or more of the query results then is selected as responsive to the received search query for display in response thereto. In embodiments, the displayed results may be derived from the lexicon specific to the computing device, the lexicon specific to the web-based content, or both.

Figure 2:
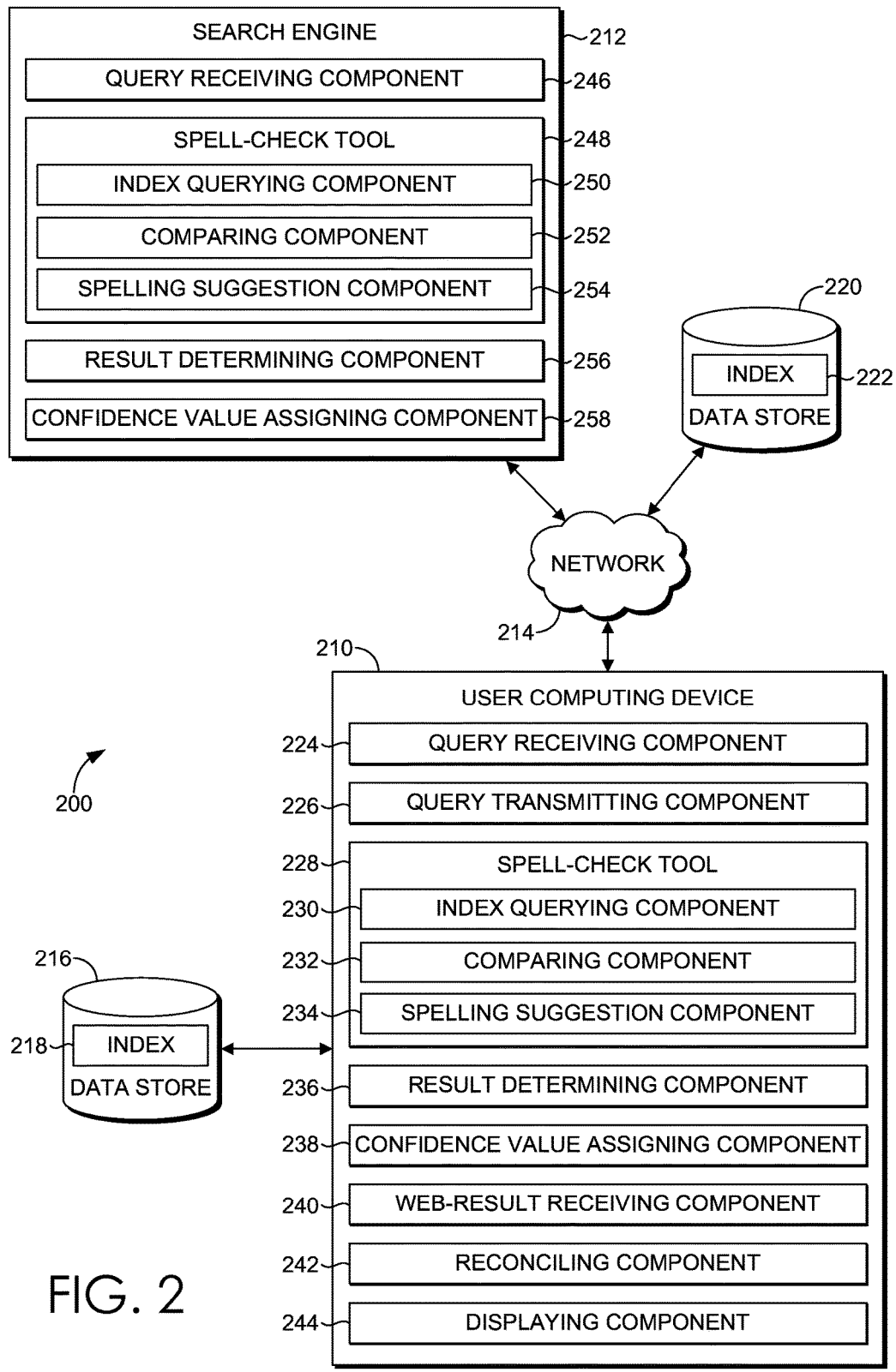
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which query results received from multiple indices, at least one index being associated with a lexicon that is specific to a computing device and at least one index being associated with a lexicon that is specific to web-based content, may be reconciled. Among other components not shown, the computing system 200 generally includes a user computing device 210 and a search engine 212 in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of user computing devices 210 and/or search engines 212 may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the search engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines and/or user computing devices. By way of example only, the search engine 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a query receiving component 224, a query transmitting component 226, a spell-check tool 228, a result determining component 236, a confidence value assigning component 238, a web-result receiving component 240, a reconciling component 242 and a displaying component 244. The illustrated user computing device 210 also has access to a data store 216. The data store 216 is configured to store information related to search queries, common search query misspellings, search navigation patterns, and potential query results as each relates to a lexicon that is specific to the computing device 210. In embodiments, the data store 216 includes an index 218 in association with which the information associated with the data store 216 is indexed. In embodiments, the data store 216 is configured to be searchable for one or more of the items stored in association therewith. It will be understood and appreciated by those of ordinary skill in the art that the information stored in association with the data store 216 may be configurable and may include any information relevant to search queries/terms, common search query misspellings, search navigation patterns, and potential query results as each relates to a lexicon that is specific to the computing device 210. The content and volume of such information are not intended to limit the scope of embodiments of the present invention in any way. Further, though illustrated as a single, independent component, the data store 216 may, in fact, be a plurality of storage devices, for instance a database cluster, portions of which may reside in association with the user computing device 210, another external computing device (not shown), and/or any combination thereof.

The query receiving component 224 of the user computing device 210 is configured to receive search queries, each search query having a first spelling. Generally, search queries are input by a user via an I/O device such as a keyboard or via a user interface presented on a display associated with the user computing device 210 and permitting alpha-numeric and/or textual input into a designated search input region. It should further be noted that embodiments of the present invention are equally applicable to devices accepting touch and/or voice input. Any and all such variations, and any combination thereof, are contemplated to be within the scope of embodiments of the present invention.

The query transmitting component 226 of the user computing device 210 is configured to transmit received search queries having a first spelling to the spell-check tool 228 associated with the user computing 210. The query transmitting component 226 further is configured to transmit received search queries having a first spelling to the query receiving component 246 of the search engine 212 (e.g., via the network 214), as more fully described below.

The spell-check tool 228 of the user computing device 210 is configured to evaluate the first spelling associated with the received search query against the information stored in association with the data store 216. In this regard, the spell-check tool 228 includes an index querying component 230, a comparing component 232, and an alternate spelling suggestion component 234. The index querying component 230 is configured to query the index 218 associated with the data store 216 for information matching (exactly or approximately, as desired) the first spelling. The comparing component 232 is configured to compare the first spelling with the index 218. The spelling suggestion component 234 is configured to suggest one or more alternate spellings for the received search query associated with the first spelling.

The result determining component 236 is configured to determine one or more query results as responsive to the received search query. Each query result may be one of a query result determined based upon the first spelling for the received search query, a suggested alternate spelling for the received search query, a query result determined based upon a suggested alternate spelling for the received query result, and a null result indicating no plausible query results may be determined based upon the first spelling or any probable alternate spellings for the received search query. In embodiments, a query result determined based upon the first spelling for the received search query represents at least an implicit indication that the first spelling for the search query is correct and a query result determined based upon a suggested alternate spelling for the received search query is at least an implicit indication that the suggested alternate spelling for the received search query is more probable than the first spelling. In embodiments, such indications may be more explicitly provided, as desired.

The confidence value assigning component 238 is configured to assign a confidence value to one or more of the query results determined by the result determining component 236 of the user computing device 210. The confidence values assigned may then be utilized to determine those results that are most likely aligned with the intent of the received search query, as more fully described below. Confidence values may be assigned based upon any desired criteria including, by way of example only, search patterns associated with users of the user computing device 210, a quantity of potentially responsive query results determined, a quantity of potential alternate spellings determined, uniqueness of a search query term having an exact query result match, and the like. The basis upon which confidence values may be assigned is not intended to limit the scope of embodiments of the present invention in any way.

Similar to the user computing device 210, the search engine 212 of FIG. 2 is configured to, among other things, receive search queries and provide query results in response thereto. However, unlike the user computing device 210, the search engine 212 is configured to receive search queries and provide query results in response thereto as such query results relate to a lexicon that is specific to web-based content. The search engine 212 is additionally configured to, among other things, identify potentially misspelled search queries/terms, suggest probable alternate spellings for search queries/terms identified as potentially misspelled, and assign confidence values to query results.

As illustrated, the search engine 212 includes a query receiving component 246, a spell-check tool 248, a result determining component 256, and a confidence value assigning component 258. The illustrated search engine 212 also has access to a data store 220. The data store 220 is configured to store information related to search queries, common search query misspellings, search navigation patterns, and query results as each relates to a lexicon that is specific to web-based content. In embodiments, the data store 220 includes an index 222 in association with which the information associated with the data store 222 is indexed. In embodiments, the data store 222 is configured to be searchable for one or more of the items stored in association therewith. It will be understood and appreciated by those of ordinary skill in the art that the information stored in association with the data store 222 may be configurable and may include any information relevant to search queries/terms, common search query misspellings, search navigation patterns, and query results as each relates to a lexicon that is specific to web-based content. The content and volume of such information are not intended to limit the scope of embodiments of the present invention in any way. Further, though illustrated as a single, independent component, the data store 222 may, in fact, be a plurality of storage devices, for instance a database cluster, portions of which may reside in association with the search engine 212, another external computing device (not shown), and/or any combination thereof.

The query receiving component 246 of the search engine 212 is configured to receive search queries, each search query having a first spelling. In embodiments, such search queries are input by a user via an I/O device such as a keyboard or via a user interface presented on a display associated with the user computing device 210 and permitting alpha-numeric and/or textual input into a designated search input region and transmitted to the query receiving component 246 of the search engine 212 via the network 214.

The spell-check tool 248 of the search engine 212 is configured to evaluate the first spelling associated with the received search query against the information stored in association with the data store 220. In this regard, the spell-check tool 248 includes an index querying component 250, a comparing component 252, and a spelling suggestion component 254. The index querying component 250 is configured to query the index 222 associated with the data store 220 for information matching (exactly or approximately, as desired) the first spelling. The comparing component 252 is configured to compare the first spelling with the index 222. The spelling suggestion component 254 is configured to suggest one or more alternate spellings for the received search query associated with the first spelling.

The result determining component 256 of the search engine 212 is configured to determine one or more query results as responsive to the received search query. Each query result may be one of a result determined based upon the first spelling for the received search query, a suggested alternate spelling for the received search query, a result determined based upon a suggested alternate spelling for the received query result, and a null result indicating no plausible query results may be determined based upon the first spelling or any probable alternate spellings for the received search query. In embodiments, a query result determined based upon the first spelling for the received search query represents at least an implicit indication that the first spelling for the search query is correct and a query result determined based upon a suggested alternate spelling for the received search query is at least an implicit indication that the suggested alternate spelling for the received search query is more probable than the first spelling. In embodiments, such indications may be more explicitly provided, as desired.

The confidence value assigning component 258 of the search engine 212 is configured to assign a confidence value to one or more of the query results determined by the result determining component 256 of the search engine 212. In embodiments, the confidence values assigned may be utilized to determine those results that are most likely reflective of the intent of the received search query and thus more likely responsive to the received query. Confidence values may be assigned by the confidence value assigning component 258 of the search engine 212 based upon any desired criteria including, by way of example only, aggregated search patterns associated with a plurality of web-content users, a quantity of potentially responsive query results determined, a quantity of potential alternate spellings determined, uniqueness of a search query term having an exact query result match, and the like. The basis upon which confidence values may be assigned utilizing the confidence value assigning component 258 of the search engine 212 is not intended to limit the scope of embodiments of the present invention in any way.

The web-result receiving component 240 of the user computing device 210 is configured to receive query results determined by the result determining component 256 of the search engine 212 and associated confidence values assigned by the confidence value assigning component 258 of the search engine 212. The reconciling component 242 is configured to reconcile the potential query results received by the web-result determining component 240 and determined by the result determining component 236 based, at least in part, upon the confidence values associated therewith and to select one or more of the potential query results as most responsive to the received search query.

The displaying component 244 is configured to, among other things, display query results, e.g., in association with the user computing device 210. In embodiments, the displaying component 244 displays at least a descriptor for the query result or results selected as most responsive to the search query and an indication of which lexicon was utilized in determining the selected query result(s) (e.g., the lexicon associated with web-based content and indexed in association with the data store 220 or the lexicon associated with the user computing device 210 and indexed in association with the data store 216). In embodiments, an indication of the spelling utilized in determining each respective query result (e.g., the first spelling or a suggested alternate spelling) also may be displayed.

It will be understood and appreciated by those of ordinary skill in the art that spell-check tools and/or confidence value assigning components associated with third party vendors (that is, vendors not associated with the search engine 212 or the user computing device 210) may be utilized in accordance with embodiments of the present invention, the results of such services being transmitted to the user computing device 210 and/or the search engine 212 as appropriate. Additionally, it will be understood that reconciliation determinations may be made prior to examination of potential search results (for instance, based upon a determination regarding whether an exact match with a search query term exists in the appropriate index or not) or after examination of potential search results (for instance, taking into account the quantity of potentially responsive query results as they relate to various spellings for a received search query/term). Any and all such variations, and any combination thereof, are contemplated to be within the scope of embodiments of the present invention.

Turning now to FIG. 3, a flow diagram is illustrated showing an exemplary method 300 for reconciling query results associated with multiple indices, in accordance with an embodiment of the present invention. As indicated at block 310, a search query is received, the search query having a first spelling associated therewith. By way of example only, the search query may be received by the query receiving component 224 of the user computing device 210 of FIG. 2. As indicated at block 312, a plurality of query results is received for the search query, each query result being derived from one of a plurality of indices. At least a first of the plurality of indices is associated with a lexicon that is specific to a user computing device (e.g., index 218 of the data store 216 associated with the user computing device 210 of FIG. 2) and at least a second of the plurality of indices is associated with a lexicon that is specific to web-based content (e.g., index 222 of the data store 220 associated with the search engine 212 of FIG. 2). By way of example only, a first portion of the plurality of query results may be determined by the result determining component 236 of the user computing device 210 of FIG. 2 and a second portion of the plurality of query results may be determined by the result determining component 256 of the search engine 212 and received by the web-result receiving component 240 of the user computing device 210 of FIG. 2. In embodiments, each received query result is one of a result determined based upon the first spelling for the search query, a suggested alternate spelling for the received search query, a result determined based upon the suggested alternate spelling for the received search query, and a null result indicating no plausible query results may be determined based upon the first spelling or any probable alternate spellings for the received search query.

As indicated at block 314, one or more of the received query results is selected as being most responsive to the search query. By way of example only, such selection may be performed by the reconciling component 242 of the user computing device 210 of FIG. 2.

With reference now to FIG. 4, a flow diagram is illustrated showing another exemplary method 400 for reconciling query results associated with multiple indices, in accordance with an embodiment of the present invention. As indicated at block 410, a search query is received, the search query having a first spelling associated therewith. By way of example only, the search query may be received by the query receiving component 224 of the user computing device 210 of FIG. 2. As indicated at block 412, the received search query is compared with a first index to determine a first query result, the first index being specific to content associated with the computing device. By way of example only, the received search query may be compared with the index 218 associated with the data store 216 of FIG. 2.

As indicated at block 414, a second query result is received from a comparison of the received search query with a second index, the second index being specific to web-based content. By way of example only, the second query result may be received by the web-result receiving component 240 of the user computing device 210 based upon a comparison of the received search query with the index 222 associated with the data store 220 of FIG. 2. In embodiments, each received and/or determined query result is one of a result determined based upon the first spelling for the search query, a suggested alternate spelling for the received search query, a result determined based upon the suggested alternate spelling for the received search query, and a null result indicating no likely query results may be determined based upon the first spelling or any probable alternate spellings for the received search query.

As indicated at block 416, one or both of the first and second query results is selected as being most responsive to the received search query. By way of example only, the most responsive query result may be selected by the reconciling component 242 of the user computing device 210 of FIG. 2 based upon which query result is associated with the most favorable confidence value. In embodiments, the selected query result is one of a result determined based upon the first spelling for the search query, a suggested alternate spelling for the received search query, a result determined based upon the suggested alternate spelling for the received search query, and a null result.

As can be understood, embodiments of the present invention provide systems, methods, and computer-readable storage media for, among other things, reconciling query results associated with multiple indices. A search query having a first spelling is received, for instance, from a user computing device. A plurality of query results is determined, each query result being derived from one of a plurality of indices. At least a first index of the plurality of indices is associated with a lexicon that is specific to the computing device and at least a second index of the plurality of indices is associated with a lexicon that is specific to web-based content. Each query result may be a result determined based upon the first spelling for the search query, a suggested alternate spelling for the received search query, a result determined based upon the suggested alternate spelling for the received search query, or a null result. One or more of the query results then is selected as responsive to the received search query. The displayed results may be derived from the lexicon specific to the computing device, the lexicon specific to the web-based content, or both.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3 and 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to perform a method for reconciling query results, the method comprising:
   at a computing device, receiving a search query comprising a word having a first spelling;
   comparing the first spelling to content stored locally on the computing device and, based on the comparison, generating a first alternate spelling suggestion;
   providing the first alternate spelling suggestion as an alternate search query against the content stored locally on the computing device and, based on the alternate search query and the content stored locally on the computing device, determining a first query result;
   receiving a second query result that is based on web-based content and on a spell-check tool associated with the web-based content;

assigning confidence values to each of the first query result and the second query result, the confidence values representing a likelihood that the respective query result is reflective of an intent of the received search query, wherein the confidence values are assigned based on a search pattern associated with a user of the computing device;

determining one of the first query result or the second query result is a more responsive query result for the search query; and providing for display a descriptor for the more responsive query result and an indication of whether the more responsive query result is associated with the content stored locally on the computing device or with the web-based content.

2. The one or more computer-readable storage media of claim 1, wherein the second query result is one of a query result determined based upon the first spelling, a second alternate spelling suggestion that is provided by the spell-check tool associated with the web-based content, a query result determined based upon the second alternate spelling suggestion, or a null result.

3. The one or more computer-readable storage media of claim 1, wherein determining the first query result comprises determining, based upon a comparison of the first alternate spelling suggestion with the content stored locally on the computing device, at least one query result that is associated with the content stored locally on the computing device.

4. The one or more computer-readable storage media of claim 1, wherein the second query result is one of an indication that the first spelling for the search query is correct, a second alternate spelling suggestion for the received search query, or a null result.

5. The one or more computer-readable storage media of claim 1, wherein the method further comprises receiving a third query result determined based upon a search conducted utilizing a query result having a confidence value that is most favorable.

6. The one or more computer-readable storage media of claim 5, wherein the method further comprises displaying an indication of the spelling utilized in determining a respective query result.

7. The one or more computer-readable storage media of claim 1, wherein the confidence values are further based on a quantity of potential alternate spelling suggestions that are generated.

8. A method being performed by one or more computing devices including at least one processor, the method for reconciling query results associated with multiple indices, the method comprising:

at a computing device, receiving a search query comprising a word having a first spelling;

comparing the first spelling to a first index that is specific to the computing device and, based on the comparison, generating a first alternate spelling suggestion;

determining a first query result based on the first alternate spelling suggestion and on the first index;

receiving a second query result from a comparison of the received search query with a second index, the second index being specific to web-based content;

assigning confidence values to each of the first query result and the second query result, the confidence values indicating a likelihood that an associated query result is reflective of an intent of the search query, wherein the confidence values are assigned based on a search pattern associated with a user of the computing device;

selecting one of the first query result or the second query result as most responsive to the received search query; and providing for display a descriptor for the selected query result that is most responsive to the received search query and an indication of which index was utilized in determining the selected query result.

9. The method of claim 8, wherein the confidence values are further based on a quantity of potential alternate spelling suggestions that are generated.

10. The method of claim 9, wherein selecting one of the first query result or the second query result as most responsive to the received search query comprises selecting the one of the first query result or the second query result having the most favorable confidence value as most responsive to the received search query.

11. The method of claim 8, wherein the first query result corresponds to an item of content that is stored locally on the computing device and the second query result comprises web-based content.

12. The method of claim 8, wherein the first alternate spelling suggestion comprises a personal contact name that is stored locally on the computing device.

13. The method of claim 8, further comprising displaying an indication of the spelling utilized in determining each query result.

14. A system comprising:

one or more processors; and one or more computer storage media storing computer-executable instructions that, when executed by the one or more processors, implement a method at a computing device, the method comprising:

receiving a search query having a first spelling;

determining a first alternate spelling suggestion based on a comparison of the first spelling with content that is stored locally on the computing device;

comparing the first spelling to the content stored locally on the computing device and, based on the comparison, generating a first query result based on the first alternate spelling suggestion and on the content that is stored locally on the computing device;

receiving a second query result that is specific to web-based content and is associated with a spell-check tool for the web-based content;

assigning confidence values to the first query result and the second query result, each assigned confidence value indicating a likelihood that an associated query result is reflective of an intent of the search query, wherein the confidence values are assigned based on a search pattern associated with a user of the computing device;

selecting one or both of the first query result and the second query result as responsive to the received search query; and providing for display a descriptor of the selected one or both of the first query result and the second query result and, for each of the selected one or both of the first query result and the second query result, an indication of whether it is associated with the content that is stored locally on the computing device or the web-based content.

15. The system of claim 14, wherein the computing device selects one of the first query result and the second query result as most responsive to the received search query by selecting the one of the first query result and the second query result having the most favorable confidence value.

16. The system of claim 14, wherein the method further comprises receiving a third query result determined based upon a search conducted utilizing a query result having a confidence value that is most favorable.

17. The system of claim 14, wherein the second query result is based on a second alternate spelling suggestion provided by the spell-check tool for the web-based content, wherein the first alternate spelling suggestion is different from the second alternate spelling suggestion.

18. The system of claim 14, wherein the first query result corresponds to an item of the content that is stored locally on the computing device and the second query result comprises web-based content.

19. The system of claim 18, wherein the search query comprises a word having the first spelling and the first alternate spelling suggestion comprises a personal contact name that is stored locally on the computing device.

20. The system of claim 19, wherein the second query result comprises a null result indicating that no plausible query results have been determined based on the first spelling or any alternate spelling determined by the spell-check tool for the web-based content.

\* \* \* \* \*